United States Patent
Chatterjee et al.

(10) Patent No.: US 6,168,746 B1
(45) Date of Patent: Jan. 2, 2001

(54) INJECTION MOLDING OF FERROELECTRIC ARTICLES

(75) Inventors: Dilip K. Chatterjee; Syamal K. Ghosh; James K. Lee, all of Rochester, NY (US)

(73) Assignee: Eastman Kodak Company, Rochester, NY (US)

(*) Notice: Under 35 U.S.C. 154(b), the term of this patent shall be extended for 0 days.

(21) Appl. No.: 09/253,847

(22) Filed: Feb. 22, 1999

(51) Int. Cl.[7] .......................... C04B 35/472; C04B 35/63
(52) U.S. Cl. ..................... 264/434; 264/435; 264/436; 264/618; 264/645; 264/678; 264/328.2
(58) Field of Search ..................... 264/434, 435, 264/436, 645, 328.2, 618, 678

(56) References Cited

U.S. PATENT DOCUMENTS

| | | |
|---|---|---|
| 4,000,110 * | 12/1976 | Saito et al. ..................... 264/645 |
| 4,649,003 * | 3/1987 | Hashimoto et al. ............... 264/645 |
| 4,734,237 | 3/1988 | Fanelli et al. . |
| 5,028,937 | 7/1991 | Khuri-Yakub et al. . |
| 5,227,813 | 7/1993 | Pies et al. . |
| 5,248,998 | 9/1993 | Ochiai et al. . |
| 5,286,767 | 2/1994 | Rohrbach et al. . |
| 5,311,218 | 5/1994 | Ochiai et al. . |
| 5,365,645 | 11/1994 | Walker et al. . |
| 5,598,196 | 1/1997 | Braun . |
| 5,600,357 | 2/1997 | Usui et al. . |
| 5,688,391 | 11/1997 | Hayes . |
| 5,725,825 * | 3/1998 | Hotomi et al. ................... 264/434 |
| 5,730,929 | 3/1998 | Majumdar et al. . |

FOREIGN PATENT DOCUMENTS 0 827 833 A2    7/1997   (EP) .

OTHER PUBLICATIONS

Abstract of JP 61026514 A, Feb. 1986.*

* cited by examiner

Primary Examiner—James Derrington
(74) Attorney, Agent, or Firm—Raymond L. Owens

(57) ABSTRACT

A method for injection molding fine particulate ceramic ferroelectric materials to form an article such as ink jet printhead includes the steps of spray drying fine particulate ceramic ferroelectric material to form agglomerate material; mixing the spray dried fine particulate ceramic ferroelectric agglomerate material with a binder system including materials selected from the group consisting of wax having wax components of different molecular weight, magnesium-X silicate, agaroid gel forming material, and agaroid gel forming material mixed with magnesium-X silicate to form a compounded material; injecting the compounded material at a selected pressure into a mold to form a green article; debinding or drying the green article; sintering the debinded or dried green article to form the final molded article; poling the final molded article to align the electrical dipoles within the piezoelectric material; forming a coating of conductive material over the top and bottom surfaces of the final molded article and then cutting grooves through conductive coating into the top surface in the valleys of the final molded article to form a channel member; and providing an orifice plate over top surface of the channel member and a substrate over the bottom surface of the channel member.

8 Claims, 4 Drawing Sheets

INJECTION MOLDING OF FERROELECTRIC ARTICLES

FIELD OF THE INVENTION

This invention relates generally to the field of injection molding of ferroelectric materials and more particularly to low and medium pressure injection molding of particulate piezoelectric, its composites, and other particulate ceramics for manufacture of low cost, high precision, and complex shaped articles such as ink jet heads.

BACKGROUND OF THE INVENTION

Experience indicates that manufacture of complex shaped devices from ferroelectric and more particularly, piezoelectric materials involve a series of complicated processing steps. Ferroelectric materials, particularly the piezoelectric materials are suitable candidates for actuators, transducers, resonators, and sensors. Because of high piezoelectric coefficients of lead based piezoelectric materials, these materials are suitable candidates for high precision ink jet heads. Unfortunately, the manufacturing processes for these piezoelectric ceramics are difficult and are very costly, primarily because of labor intensive machining processes to produce high precision complex shaped articles. Injection molding, however, is a technique which can be successfully utilized to manufacture large volumes of complex shaped articles in a cost effective way. Injection molding of inorganic powders with very fine particulate size, such as ferroelectric lead based piezoelectric materials, and a wide variation in particle size such as in composites of these ferroelectric materials, pose a multitude of manufacturing problems.

An ink jet printhead made from a piezoelectric material is used to selectively eject ink droplets onto a receiver to form an image. Within the printhead, the ink may be contained in a plurality of channels and energy pulses are used to actuate the printhead channels causing the droplets of ink to be ejected on demand or continuously, through orifices in a plate in an orifice structure.

In one representative configuration, a piezoelectric ink jet printing system includes a body of piezoelectric material defining an array of parallel open topped channels separated by walls. In the typical case of such an array, the channels are micro-sized and are arranged such that the spacing between the adjacent channels is relatively small. The channel walls have metal electrodes on opposite sides thereof to form shear mode actuators for causing droplets to expel from the channels. An orifice structure comprising at least one orifice plate defining the orifices through which the ink droplets are ejected, is bonded to the open end of the channels. In operation of piezoelectric printheads, ink is directed to and resides in the channels until selectively ejected therefrom. To eject an ink droplet through one of the selected orifices, the electrodes on the two side wall portions of the channel in operative relationship with the selected orifice are electrically energized causing the side walls of the channel to deflect into the channel and return to their normal undeflected positions when the applied voltage is withdrawn. The driven inward deflection of the opposite channel wall portions reduces the effective volume of the channel thereby increasing the pressure of the ink confined within the channel to force few ink droplets, 1 to 100 pico-liters in volume, outwardly through the orifice. Operation of piezoelectric ink jet printheads is described in detail in U.S. Pat. Nos. 5,598,196; 5,311,218; 5,365,645; 5,688,391; 5,600, 357, and 5,248,998.

The use of piezoelectric materials in ink jet printheads is well known. The piezoelectric materials forms a special class of ferroelectric materials, wherein the ferroelectric materials develop an electric field when subjected to pressure forces, or conversely, exhibit a mechanical deformation when subjected to an electric field. Most commonly used piezoelectric material is lead-zirconate-titanate, (PZT) ceramic which is used as a transducer by which electrical energy is converted into mechanical energy by applying an electric field across the material, thereby causing the piezoelectric ceramic to deform.

Under previous methods of making piezoelectric ink jet printheads, a block of piezoelectric ceramic such as PZT in which channels are to be formed is poled, to make the material piezoelectrically deflectable or "active", by imparting a predetermined voltage widthwise across the piezoelectric ceramic block in a selected poling direction of the internal channel side wall sections later to be created in the poled ceramic body section by forming a spaced series of parallel grooves therein. These grooves are generally formed by sawing, laser cutting or etching process. This current process of poling a bulk ceramic and later fabricating micro-sized channels by sawing or other processes is discussed in details in U.S. Pat. Nos. 5,227,813, and 5,028,937, and EP Patent 827833. This process of forming channels is not only time consuming and expensive, but also is amenable to many defects generated during cutting the channels thereby reducing the throughput and increasing the unit manufacturing cost. Furthermore, mechanical damages caused during sawing or laser cutting also are detrimental to the piezoelectric characteristics of the material.

In order to produce a lead based piezoelectric material, such as lead-zirconate-titanate (PZT), pure zirconium and titanium need to be alloyed with lead. Lead zirconate and lead titanate are crushed and mixed in appropriate proportion and calcined at a high temperature to form a piezoelectric material of requisite piezoelectric coefficient. In the powder form of the piezoelectric material, the crystallite size needs to be maintained at a submicron level, preferably at or below 0.3 $\mu$m for the ease of processing and development of uniform grain structure in the manufactured components.

SUMMARY OF THE INVENTION

It is an object of the present invention to provide an improved method for manufacturing of ferroelectric articles of complex shapes and more particularly, of piezoelectric articles of complex shapes, such as ink jet printheads.

It is also an object of the present invention to provide a method of making piezoelectric ceramic ink jet printhead which will eliminate time consuming and costly processes of cutting channels.

Almost all the prior art in the field of injection molding fails to teach the molding process which is effective either at ambient temperature or at low temperature (<100° C.) Generally, any manufacturing process at ambient temperature/low temperatures provide a multitude of advantages wherein close control of temperature dependent variables, such as injection pressure and viscosity of the injected materials is not warranted.

This object is achieved in a method for injection molding fine particulate ceramic ferroelectric materials to form an article such as ink jet printhead comprising the steps of:

(a) spray drying fine particulate ceramic ferroelectric material to form agglomerate material;

(b) mixing the spray dried fine particulate agglomerate ceramic ferroelectric material with a binder system including materials selected from the group consisting of wax having wax components of different molecular weight, magnesium-X silicate, agaroid gel forming material, and agaroid gel forming material mixed with magnesium-X silicate to form a compounded material;

(c) injecting the compounded material at a selected pressure into a mold to form a green article;

(d) debinding or drying the green article;

(e) sintering the debinded or dried green article to form the final molded article;

(f) poling the final molded article to align the electrical dipoles within the piezoelectric material;

(g) forming a coating of conductive material over the top and bottom surfaces of the final molded article and then cutting grooves through conductive coating into the top surface in the valleys of the final molded article to form a channel member; and (h) providing an orifice plate over top surface of the channel member and a substrate over the bottom surface of the channel member.

The present invention is directed to injection molding of fine particulate ceramic ferroelectric, more particularly piezoelectric materials and composites thereof at either low or medium pressure ranges. The present invention is particularly suitable for injection molding of fine particulate ceramic ferroelectric materials which can be poled to form an ink jet printhead.

The present invention has the following advantages:

1. It provides a cost effective method for manufacturing "net" or "near-net" shape articles/components having complex/intricate shapes.

2. It makes large volume production of ceramic articles, particularly ferroelectric components feasible.

3. Intricate shaped articles of toxic materials, such as lead based piezoelectric materials can be manufactured safely by reducing the toxic dust and scraps which normally is generated in conventional manufacturing processes.

DETAILED DESCRIPTION OF THE INVENTION

The present invention provides a method of making ferroelectric articles, specifically piezoelectric printheads using both low- and medium pressure injection molding to form a series of closely spaced micro-sized parallel channels on both sides of the injection molded member. The channel members are then poled, electrically conductive electrodes are formed on both surfaces and top channels are cut with a saw or other means to physically separate the electrodes on both side walls of each channel. The open end of the ink channels are covered with an orifice plate and the other end is mounted on a substrate.

In the method of this invention, broadly illustrated in FIG. 1, a ferroelectric ceramic powder, more particularly a piezoelectric lead based lead-zirconate-titanate powder of specific composition is used for making injection molded ferroelectric/piezoelectric articles, as discussed fully below. In order to produce a lead based piezoelectric material, such as lead-zirconate-titanate (PZT), pure zirconium and titanium metals need to be alloyed with metallic lead. Lead zirconium and lead titanium alloys are crushed and oxidized to form lead zirconate and lead titanate. Lead zirconate and lead titanate are then crushed and mixed in appropriate chemical proportions and calcined at a high temperature to form a piezoelectric material of requisite piezoelectric coefficient. PZT powder of various grades are also commercially available from Piezo Kinetics, Inc. (Bellefonte, Pa.). In the powder form of the piezoelectric material, the crystallite size needs to be maintained at a submicron level, preferably at or below 0.3 $\mu$m for the ease of processing and development of uniform grain structure in the manufactured components. The piezoelectric composite materials are produced by mixing fine particulates of either zirconia or alumina with PZT powders. The motivation for producing piezoelectric composite materials are to enhance the strength and fracture toughness of the piezoelectric materials. Generally, the amount of composite forming ingredients, such as alumina or zirconia are maintained at a low level so that piezoelectric coefficients of the composites are not degraded. A typical piezoelectric lead-zirconate-titanate (PZT) material having chemical composition $Pb(Zr_zTi_{1-z})O_3$, where z=0.52 to 0.55, can be used for injection molding to produce ink jet printheads. About 0.5 to 5.0 weight percent, preferably about 1.0 to 2.0 weight percent of either alumina or zirconia is added to the above described PZT material to enhance its fracture toughness and mechanical strength.

Figure 1:
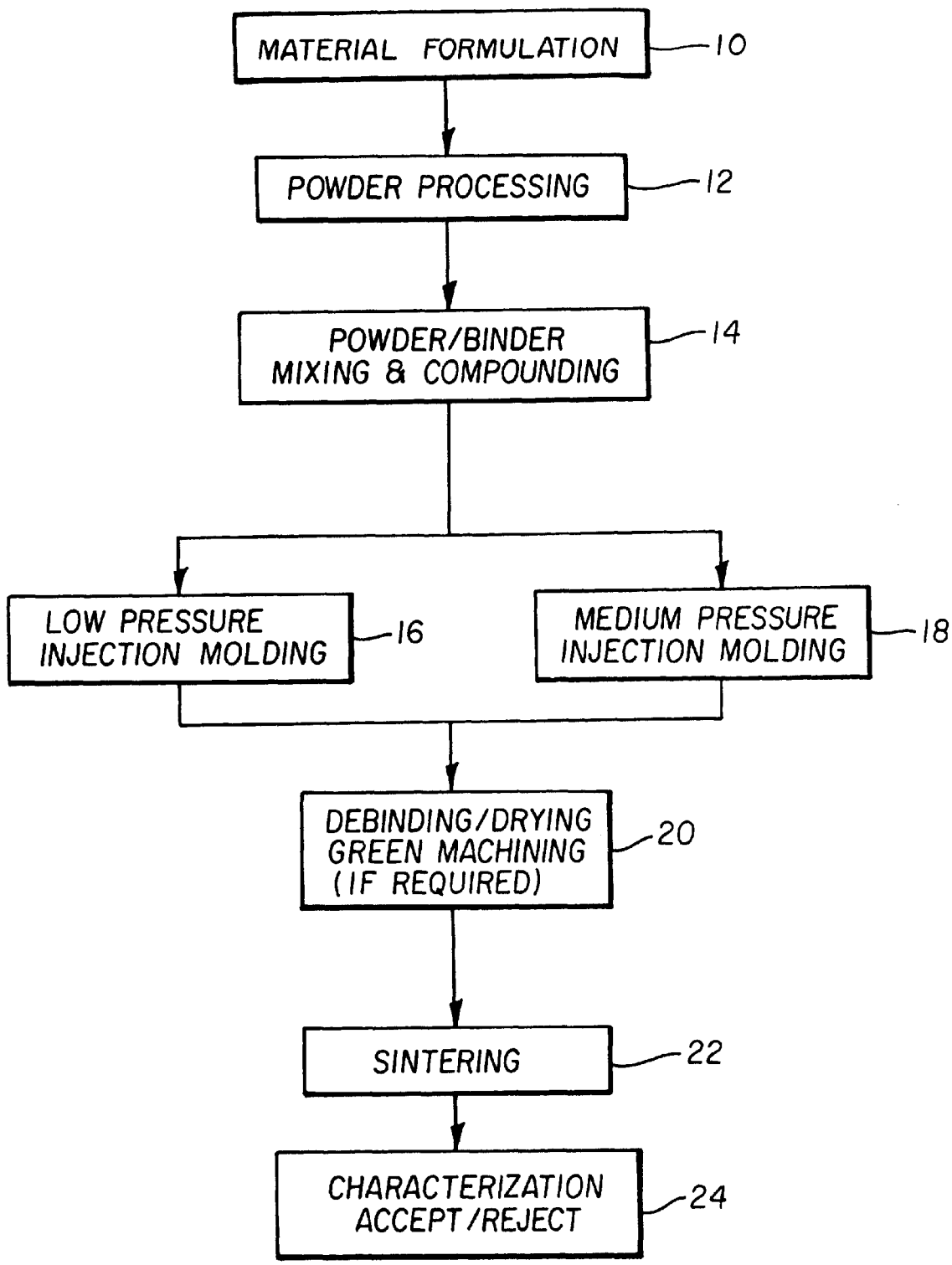
FIG. 1 is a schematic flow diagram illustrating the steps of the method of the invention.

According to FIG. 1, the method commences with block 10 calling for preparation or material formulation of ferroelectric, more specifically piezoelectric powder. Appropriate proportion of lead zirconate and lead titanate are mixed, ball milled for about 24 hours, and calcined at 1400° C. to form a piezoelectric lead-zirconate-titanate (PZT) material having chemical composition $Pb(Zr_zTi_{1-z})O_3$, where z=0.52 to 0.55. In some cases, composite piezoelectric materials were prepared by typically adding about 0.5 to 5.0 weight percent of either alumina or zirconia.

The next step in the process is powder processing as represented by block 12 (FIG. 1), insures PZT powder or its composites a uniformly distributed mixture. In the case of PZT this is achieved by spray drying. In the case of PZT composites, this is achieved by mixing mechanically or chemically; for example, mixing by co-precipitation followed by spray drying. In the spray drying process, the submicron powder or powder mixture is agglomerated. The agglomerate sizes and distributions, moisture contents, and binders (if any) can be varied in both the PZT and the composites in a manner known to those skilled in the art.

Agglomerate is defined as an aggregation of individual particles, each of which may comprise multiple grains. Grain is defined as an individual crystal, which may be within a particle, having a spatial orientation that is distinct from that of adjacent grains.

An example of convenient particulate characteristics for a specific embodiment of the invention is the following: Purity of PZT is preferably well controlled at 99.9 to 99.99 percent; that is, impurities are no more than about 0.1 to 0.01 percent. The particle size is from about 0.1 $\mu$m to about 0.1 $\mu$m. The average particle size is 0.3 $\mu$m. Agglomerate size is from about 30 to about 60 $\mu$m and average agglomerate size is 40–60 $\mu$m. Moisture content is about 0.2 to 1.0 percent by volume and is preferably 0.5 percent. The particle size of alumina and zirconia (which is used to form composites) is 0.5 to 1.5 $\mu$m with the average being 1.0 $\mu$m.

In the next step, represented by block 14, binders such as paraffin wax having wax components of different molecular weight, bees wax, gelatin, polyethylene glycol (PEG), acrylic, polyvinyl ionomer, or polyvinyl alcohol, magnesium-X silicate, agaroid gel forming material, and agaroid gel forming material mixed with magnesium-X silicate are mixed with the particulate mixture of ferroelectric material, more particularly PZT or a composite mixture of PZT with either alumina or zirconia. This can be achieved preferably by spray drying or ball milling (mixing) prior to the placement of the mixture in a compounding device. (See commonly assigned U.S. Ser. No. 08/960,670 filed Oct. 30, 1997, entitled "Low Pressure Injection Molding of Fine Particulate Zirconia, Its Composites and Other Ceramics" by Chatterjee et al, the disclosure of which is incorporated herein by reference.)

Compounding, in which the particulate mixture or mixtures are mixed with greater than about 20% by weight of an organic binder such as paraffin at a temperature higher than the glass transition temperature of such binder for subsequent low pressure injection molding process. Low pressure injection molding (block 16 of FIG. 1) is normally carried out at a pressure range of 10 to 80 psi (pounds per square inch.) For medium pressure injection molding (block 18 of FIG. 1), which is normally carried out at a pressure range of 1,000 to 10,000 psi, the preferred binder system is an aqueous based, such as polyvinyl alcohol, magnesium-X silicate, agaroid gel forming material, and agaroid gel forming material mixed with magnesium-X silicate. The binder system comprising magnesium-X silicate is in a solvent wherein X represents lithium, sodium, potassium or other monovalent ion. (See commonly assigned U.S. Pat. No. 5,730,929, the disclosure of which is incorporated herein by reference.) The binder allows one to adjust the viscosity of the injected ferroelectric composition so that ambient or low temperature, medium pressure injection molding possible. Additionally, the use of binder containing magnesium-X silicate allows one to adjust the viscosity of the injectable ferroelectric ceramic composition of varying particle size and particle size distribution.

The magnesium-X silicate wherein X represents lithium, sodium, potassium or other monovalent ion is a commercially available synthetic smectitie clay which closely resembles the natural clay mineral hectorite in both structure and composition. Hectorite is a natural swelling clay which is relatively rare and occurs contaminated with other minerals such as quartz which are difficult and expensive to remove. Synthetic smectite is free from natural impurities, and is prepared under controlled conditions. One such synthetic smectite clay is commercially marketed under the tradename Laponite® by Laponite Industries, Ltd. of United Kingdom through its U.S subsidiary, Southern Clay Products, Inc. It is a three-layered hydrous magnesium-X silicate wherein X represents lithium, sodium, potassium or other monovalent ion, in which magnesium ions, partially replaced by suitable monovalent ions such as lithium and/or vacancies, are octahedrally bound to oxygen and/or hydroxyl ions, some of which may be replaced by fluorine ions, forming the central octahedral sheet; such an octahedral sheet is sandwiched between two tetrahedral sheets of silicon ions, tetrahedrally bound to oxygen.

There are many grades of Laponite® such as RD, RDS, J, S and others, each with unique characteristics and can be used for the present invention. Some of these products contain a polyphosphate peptizing agent such as tetrasodium pyrophosphate for rapid dispersion capability; alternatively, a suitable peptizer can be incorporated into Laponite® subsequently for the same purpose. A typical chemical analysis and physical properties of Laponite® RDS are as follows:

TABLE 1

Typical Chemical Analysis

| Component | Weight % |
|---|---|
| $SiO_2$ | 54.5 |
| MgO | 26.0 |
| $Li_2O$ | 0.8 |
| $Na_2O$ | 5.6 |
| $P_2O_5$ | 4.1 |
| Loss on ignition | 8.0 |

TABLE 2

Typical Physical Properties

| | |
|---|---|
| Appearance | White Powder |
| Bulk density | 1000 kg/m$^3$ |
| Surface Area | 330 m$^2$/g |
| pH (2% suspension) | 9.7 |
| Sieve analysis | 98% < 250 m |
| Moisture content | 10% |

Having a layered clay type structure, Laponite® separates into tiny platelets of lateral dimension of 25–50 nm and a thickness of 1–5 nm in deionized aqueous dispersion, commonly referred to as sols. Typical concentration of Laponite in a sol can be 0.1 percent to 10 percent. During dispersion in deionized water an electrical double layer forms around the clay platelets resulting in repulsion between them and no structure build up. However, in a formula containing electrolytes introduced from tap water or other ingredients, the double layer can be reduced resulting in attraction between the platelets forming a "house of cards" structure. Owing to the ionic nature of these bonds they can be easily broken or reformed, resulting in a highly thixotropic rheology with low viscosity under shear and a high yield value. This distinctive thixotropic rheology is utilized in the present invention. Illustration of Laponite's shear thinning rheology and viscosity build after removal of shear is found in Technical bulletin TB-3, Laponite Properties and Applications, published by Southern Clay Products.

Binder system containing agar (or agaroid mixture) are basically sugar and is water soluble. Cellulose-derived binders, such as agar, agaroid, and agarose (derived from agar by additional purification) all belong to the chemical family of carbohydrates and/or polysaccharides. When agar/agaroid are mixed intimately with fine particulate PZT in the compounding process, it enhances gel formation and the mixture becomes viscous enabling it injection moldable. The agaroid gel forming materials can also be added with magnesium-X silicate to form a binder system with greater flexibility in the control of final viscosity of the PZT compounded material. (See U.S. Pat. Nos. 4,734,237 and 5,286,767.)

After the ferroelectric/piezoelectric ceramic material is compounded with appropriate binder system it is injection molded. For the compounded material with binder system employing wax or other organic binder system, the preferred method of molding was low pressure injection molding employing a PELTSMAN, model- MIGL-33 machine. For aqueous based compounded materials, medium pressure injection molding was carried out using a BOY-22M molding machine.

The product of injection molding is called the "green article", which does not possesses sufficient strength so that it can not be machined (which is called green machining).

In the next step of the process represented by block 20 in FIG. 1, the "green ceramic article", formed by low pressure injection molding, is debinded at approximately 220° C. for 12 hours to remove the wax or organic binders. Complete removal of the binder system is not encouraged. About five percent of the binder originally used was allowed to remain in the green bodies. The temperature and the length of time the temperature is maintained in the debinding step is dependent on the type of binder used and on achieving the five percent remainder of binder in the green body. For the medium pressure injection molded articles with aqueous based binder system air drying of the articles in room temperature is preferred. The organic binder content in the compounded material is about 2–5% by weight and, therefore, does not require debinding. However, if the cross-section of the articles are large, drying at around 100° C. is recommended. It is to be noted that some complex geometrical articles may require initial machining prior to the final sintering process. This type of machining is called "green machining". If required, green machining is carried out on debinded or dried green article.

The next step of the process, the sintering step, is represented by block 22 of FIG. 1. Sintering of the green injection molded ferroelectric article, particularly the piezoelectric article is performed at a temperature range from about 1200° C. to about 1400° C., or more preferably about 1300° C. in air atmosphere. Preferable sintering times are in the range from about 1 hour to about 3 hours, or more preferably, about 2 hours. In a particular embodiment of the method of this invention, the sintering peak temperature is 1300° C. and that temperature is maintained for about 2 hours. It is preferred that the pre-sintered articles be slowly heated to sintering temperature and slowly cooled so as to avoid undesirable dimensional changes, distortions, and crack development. In an embodiment of the invention having a preferred sintering temperature of 1300° C., preferred temperature ramps during heating are: about 0.3° C./minute from room temperature to about 300° C.; about 0.1° C./minute from about 300° C. to about 400° C.; about 0.4° C./minute from about 400° C. to about 600° C.; and about 1.5° C./minute from about 600° C. to about 1300° C. Preferred temperature ramps during cooling are: about 2° C./minute from about 1300° C. to about 800° C., and about 1.6° C./minute from about 800° C. to ambient (room) temperature.

It is preferred that the sintering result in a ceramic article having a "full" or nearly 100% of theoretical density, and it is more preferred that the density of the ceramic article be from about 99.0 to about 99.9 percent of theoretical density. Sintering is conducted in air or other oxygen containing atmospheres.

The methods of the present invention are not limited to any particular sintering pressure and temperature conditions. Sintering can be performed at atmospheric pressure, or alternatively a higher pressure such as that used in hot isostatic pressing, which can be used to reduce porosity. The sintering is continued for a sufficient time period so that the article being sintered reaches a thermodynamic equilibrium. An example of a useful range of elevated sintering pressures is from about 69 MPa to about 207 MPa, or more preferably about 100–103 MPa.

Referring to FIG. 1 again, the next step of the process is set out by block 24 wherein the article is either accepted or rejected based on the characterization which includes density measurement, X-ray diffraction, dimensional accuracy, and soundness of the article.

The composite piezoelectric materials of interest to this invention are composites of zirconia or alumina. The composites enhance both strength and fracture toughness of the piezoelectric materials. However, the piezoelectric coefficient of the composites decreases because of the lead dilution effect. In such situation some compositional adjustments may be required to enhance the piezoelectric coefficient. In the case of composites, the particle size distribution between the components of the composites normally have a wide range of variation.

Figure 2:
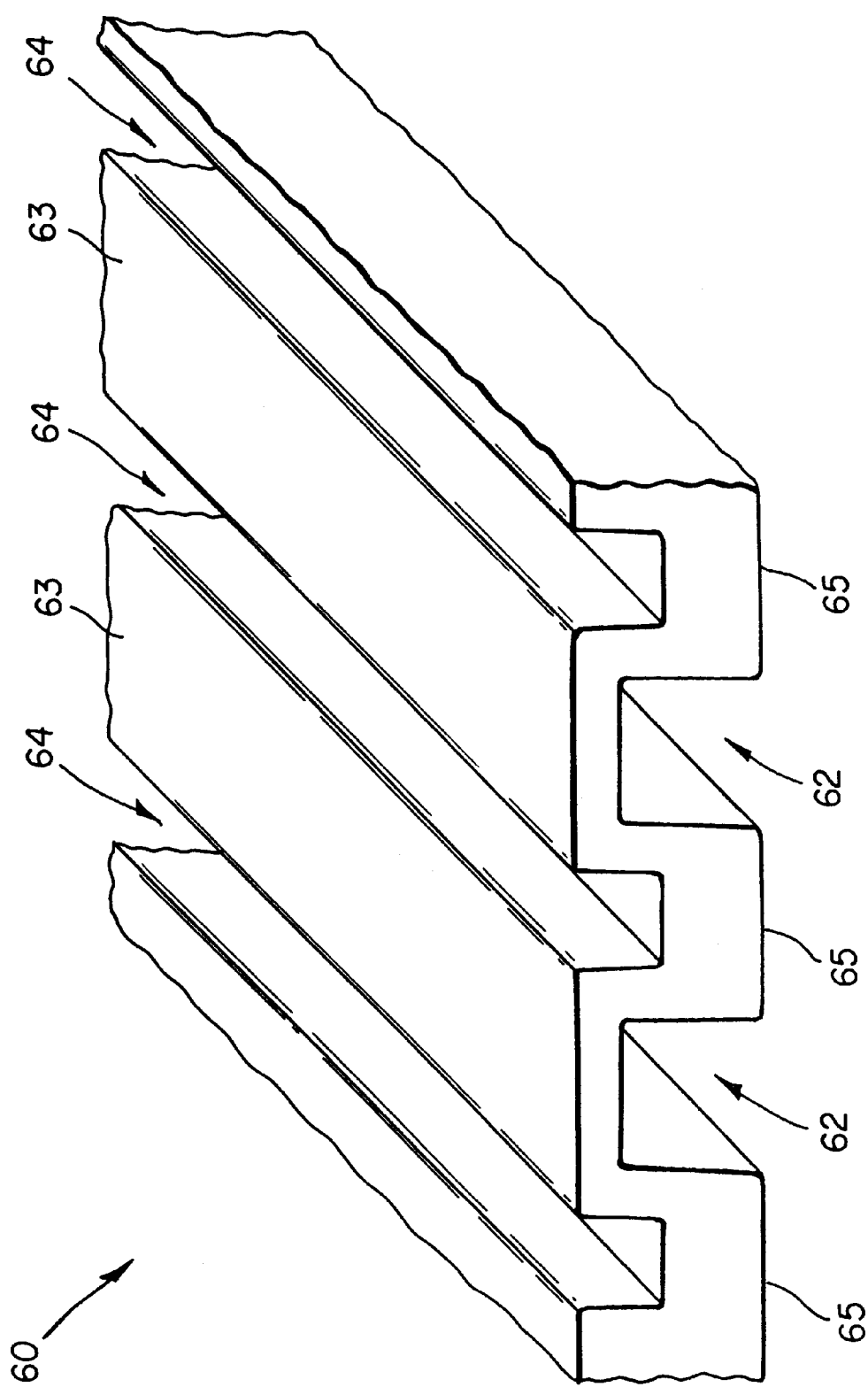
FIG. 2 is an enlarged partial isometric view of the channel member.

Referring to FIG. 2, a partial isometric view of the sintered piezoelectric ceramic channel member 60, produced by either low- or medium pressure injection molding as described above, is shown. A series of micro-sized parallel channels 62 that are formed by the injection molding process, as illustrated in FIG. 1, are used as ink channels. The width of each channel may vary from 100 to 500 $\mu$m and the height may vary from 100 to 1000 $\mu$m. The micro-sized channels 64 formed by the injection molding process help create parallel walls in each ink channel 62 so that each channel 62 can be individually addressed and actuated to expel the ink to the receiver. The width of the channels 64 may vary from 50 to 200 $\mu$m and the depth of the channels 64 may vary from 50 to 300 $\mu$m. Two heavy duty electrodes in the form of metal plates are placed on parallel first and second surfaces 63 and 65, respectively, clamped tightly, immersed in a bath of oil having high dielectric constant (1,000 to 2500) and a very high voltage is applied across the electrodes to pole the piezoelectric ceramic material along the thickness of the piezoelectric ceramic channel member 60. The reason for selecting high dielectric oil during poling is that the applied electric field is not distorted and the ceramic channel member 60 is poled uniformly.

Figure 3:
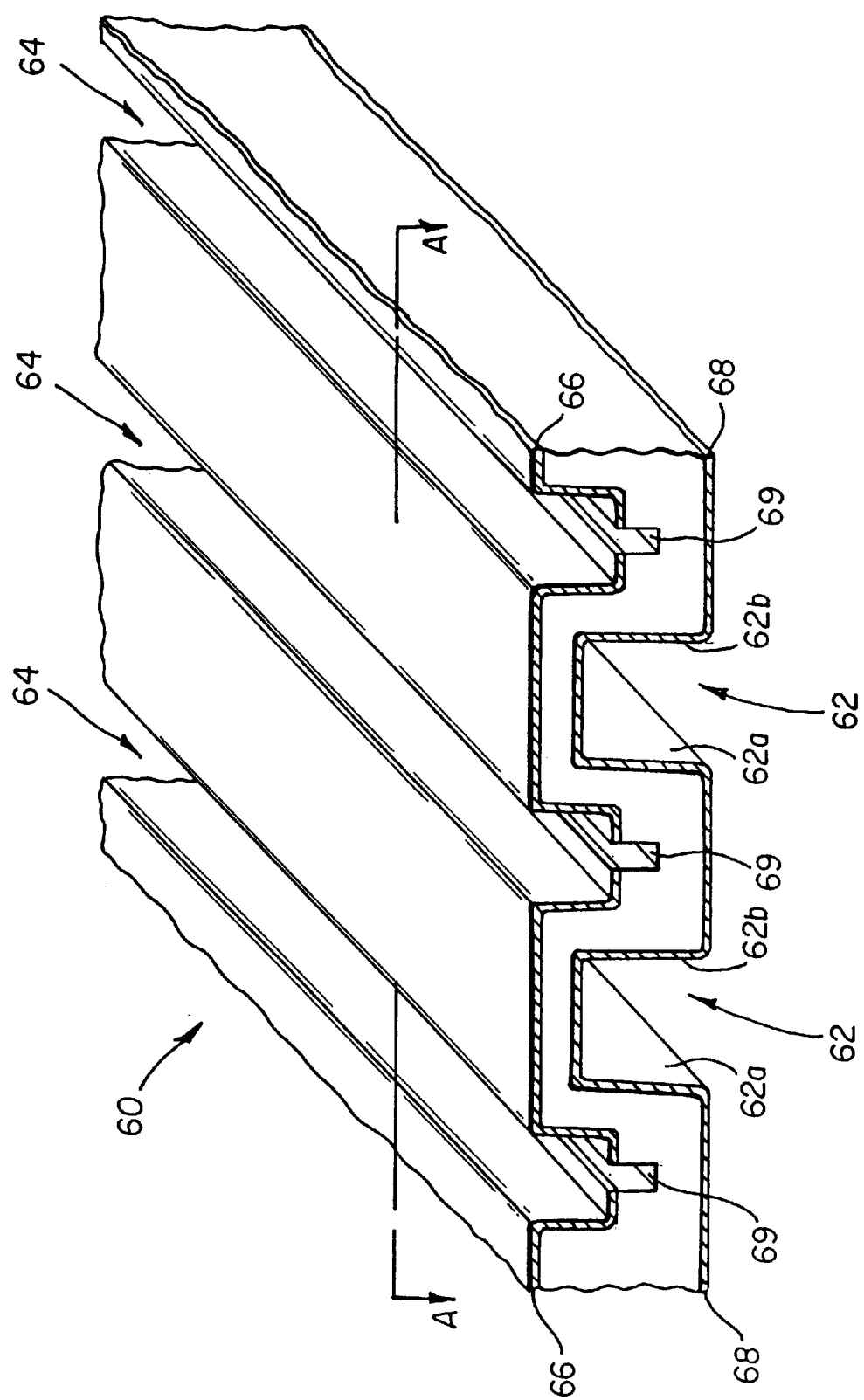
FIG. 3 is an enlarged partial isometric view of the channel member after grooves have been cut.

Referring to FIG. 3, a partial isometric view of the ceramic piezoelectric ceramic channel member 60 is shown wherein electrically conductive coatings 66 and 68 have been deposited on both the parallel first and second surfaces 63 and 65, respectively. The row of top channels 64 are then cut with a saw or a laser (Nd-YAG or excimer) to form grooves or narrow channels 69 which help electrically separating each ink channel 62 from each other. These grooves 69 help improve the flexibility of the side walls 62a and 62b of the ink channels 62 for ease of ink ejection.

Figure 4:
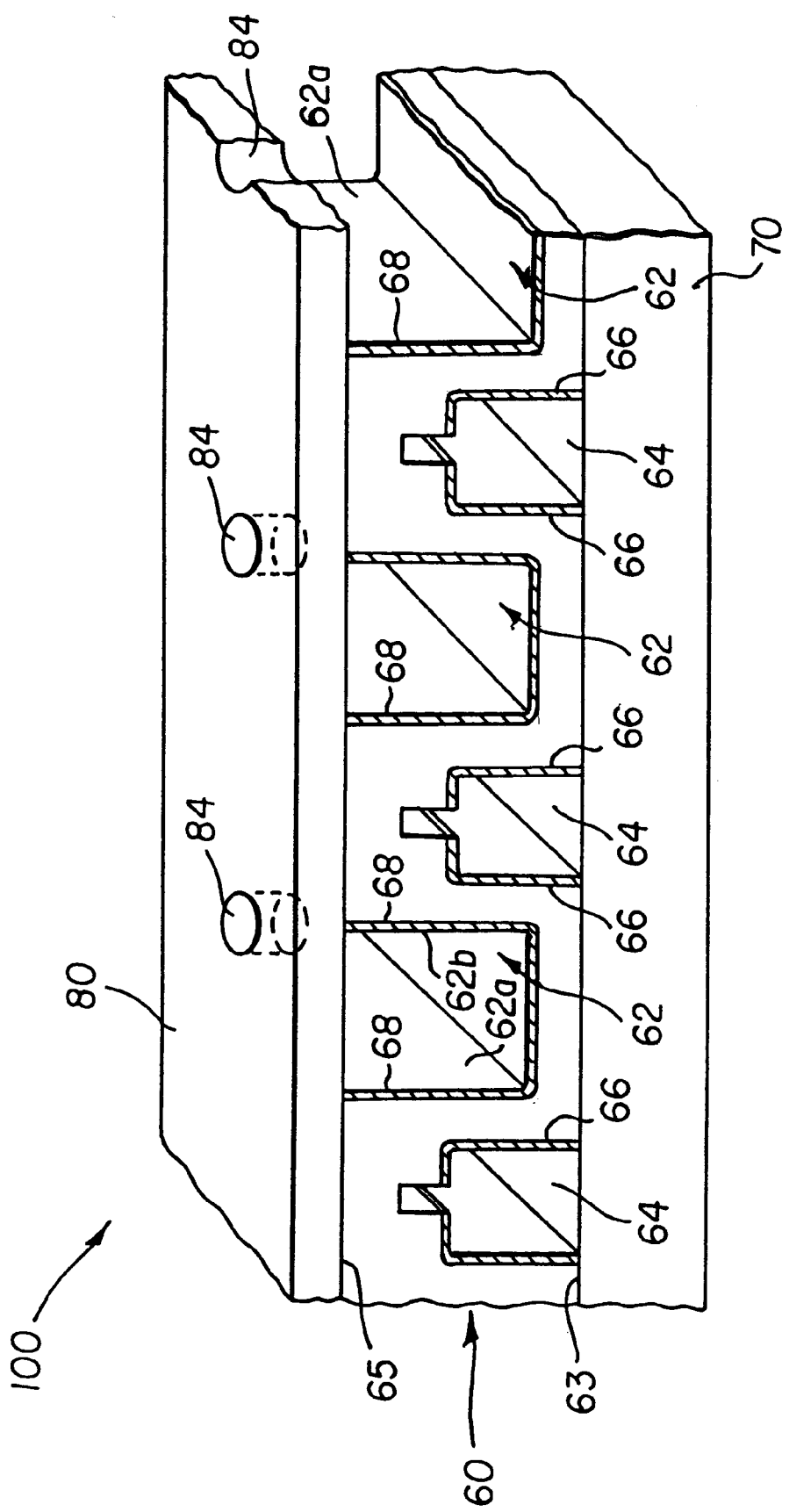
FIG. 4 is an enlarged partial isometric view of a completed ceramic piezoelectric printhead having a channel member and orifice plate.

Referring to FIG. 4, a partial isometric view of an assembled ink jet ceramic piezoelectric printhead 100 according to the present invention is shown. The first surface 63 of the ceramic piezoelectric channel member 60 is bonded with a base plate 70 and the second surface 65 of the ceramic piezoelectric channel member 60 is bonded with an orifice plate 80 in which a row of orifices 84 is aligned with the open end of the ink channel 62. The electrodes 66 and 68 on the opposite sides of the walls 62a and 62b are electrically connected such that a microprocessor can address each ink channel 62 individually to cause the inward deflection and expel ink droplets to the receiver.

While the invention has been described with a certain degree of particularity, it is manifest that many changes may be made in the details of the construction and the arrangement of components without departing from the spirit and scope of the disclosure. It is understood that the invention is not limited to the embodiments set forth herein for purposes of exemplification, but is to be limited only by the scope of the attached claims, including the full range of equivalency to which each element thereof is entitled.

The invention has been described in detail with particular reference to certain preferred embodiments thereof, but it will be understood that variations and modifications can be effected within the spirit and scope of the invention.

PARTS LIST

| | |
|---|---|
| 10 | material formulation |
| 12 | powder processing |
| 14 | powder/binder mixing and compounding |
| 16 | low pressure injection molding |
| 18 | medium pressure injection molding |
| 20 | debinding/drying |
| 22 | sintering |
| 24 | characterization accept/reject |
| 60 | piezoelectric ceramic channel |
| 62 | ink channel |
| 62a | ink channel side wall |
| 62b | ink channel side wall |
| 63 | first surface |
| 64 | channel |
| 65 | second surface |
| 66 | metal electrode |
| 68 | metal electrode |
| 69 | channel |
| 70 | base plate |
| 80 | orifice plate |
| 84 | orifice |
| 100 | ceramic piezoelectric printhead |

What is claimed is:

1. A method for injection molding fine particulate ceramic ferroelectric materials to form an article comprising the steps of:

(a) spray drying fine particulate ceramic ferroelectric material to form agglomerate material;

(b) mixing the spray dried fine particulate ceramic agglomerate ferroelectric material with a binder system including materials selected from the group consisting of wax having wax components of different molecular weight, magnesium-X silicate, agaroid gel forming material, and agaroid gel forming material mixed with magnesium-X silicate to form a compounded material;

(c) injecting the compounded material at a selected pressure into a mold to form a green article with first and second surfaces, each having a series of channels;

(d) debinding or drying the green article;

(e) sintering the debinded or dried green article to form the final molded article;

(f) polling the final molded article to align the electrical dipoles within the piezoelectric material;

(g) forming a coating of conductive material over the first and second surfaces of the final molded article and then cutting grooves through conductive coating at the bottom surface of the channels in the first surface of the final molded article; and (h) providing an orifice plate over second surface of the channel member and a substrate over the first surface of the final molded article.

2. The method of claim 1 wherein the selected pressure is in the range from 10 to 70 psi.

3. The method of claim 1 wherein the selected pressure is in the range from 1,000 to 10,000 psi.

4. A method according to claim 1 wherein the temperature at which the compounded material is injected ranges from 70° C. to 100° C.

5. A method according to claim 1 wherein the compounded material is injected into the mold in 20 to 40 sec.

6. A method according to claim 1 wherein the fine particulate ceramic ferroelectric material ranges in particle size from 0.1 to 1.0 µm.

7. A method according to claim 1 wherein the temperature at which the compounded material is injected is ambient temperature.

8. A method according to claim 1 wherein the temperature at which the compounded material is injected is less than 100° C.

* * * * *